(12) United States Patent
Conner (10) Patent No.: US 11,001,908 B1
(45) Date of Patent: May 11, 2021

(54) SYSTEM AND METHOD FOR CLEANING MAGNESIUM SCRAP FOR RE-MELTING WITH REDUCED ENVIRONMENTAL IMPACT

(71) Applicant: Wade T. Conner, Indianapolis, IN (US)

(72) Inventor: Wade T. Conner, Indianapolis, IN (US)

( * ) Notice: Subject to any disclaimer, the term of this patent is extended or adjusted under 35 U.S.C. 154(b) by 0 days.

(21) Appl. No.: 16/804,636

(22) Filed: Feb. 28, 2020

(51) Int. Cl.
| C22B 26/22 | (2006.01) |
| C22B 1/00 | (2006.01) |
| C22B 7/00 | (2006.01) |
| C22B 9/02 | (2006.01) |

(52) U.S. Cl.
CPC .............. C22B 26/22 (2013.01); C22B 1/005 (2013.01); C22B 7/006 (2013.01); C22B 9/02 (2013.01)

(58) Field of Classification Search
CPC ......... C22B 26/22; C22B 1/005; C22B 7/006; C22B 9/02; C22B 15/0056
See application file for complete search history.

(56) References Cited

U.S. PATENT DOCUMENTS

| 4,441,922 A | * | 4/1984 | Most ....................... C22B 1/005 |
| | | | 110/216 |
| 5,133,808 A | * | 7/1992 | Sorrentino .............. B08B 3/045 |
| | | | 134/10 |
| 5,350,457 A | * | 9/1994 | Kitazawa ................. C11D 1/72 |
| | | | 134/1 |
| 5,593,598 A | * | 1/1997 | McGinness ........... C02F 1/4672 |
| | | | 134/10 |
| 2018/0010210 A1 | * | 1/2018 | Tan ......................... C23G 1/12 |

* cited by examiner

Primary Examiner — Scott R Kastler
(74) Attorney, Agent, or Firm — Barnes & Thornburg LLP (57) ABSTRACT

The present disclosure teaches magnesium scrap cleaning processes that remove surface oil, grease, hydrocarbons, and other contaminants from dirty, magnesium scrap produced from different machining operations and provide clean magnesium scrap ready for re-melting. The magnesium scrap cleaning processes can reduce the dross produced during re-melting of the magnesium scrap.

22 Claims, 4 Drawing Sheets

SYSTEM AND METHOD FOR CLEANING MAGNESIUM SCRAP FOR RE-MELTING WITH REDUCED ENVIRONMENTAL IMPACT

FIELD OF THE DISCLOSURE

The present disclosure relates generally to scrap metal handling, and more specifically to magnesium scrap metal processing for reuse.

BACKGROUND

Magnesium offers unique material qualities and advantages that make it desirable for several manufacturing and industrial applications. Recycling magnesium scrap from various manufacturing processes or post-consumer use helps reduce costs and the amount of waste sent to landfills. These various manufacturing operations produce different types of magnesium scrap, i.e. high-grade scrap and low-grade scrap. High-grade scrap includes contaminant-free scrap such as runners, gates, and drippings from die cast operations. Low-grade scrap includes post-consumer scrap such as surface contaminated scrap with oily film, dirt, and/or other grime from machining operations, magnesium dross from melting operations, oxidized magnesium scrap from die cast operations, or other post-consumer products like used car parts.

To recycle high-grade and low-grade magnesium scrap, magnesium scrap may be melted down to be recast into magnesium ingots. If melted down for reuse, low-grade magnesium scrap produces molten magnesium contaminated with dross, slag, and other impurities that needs to be separated from the molten magnesium. Removing unwanted dross and impurities is very difficult and contributes to high melt losses. The resulting high melt losses reduce the efficiency of recycling magnesium scrap and increases the cost to do so. To this end, processes incorporating methods for removing contaminants from magnesium scrap before reuse are desirable. However, designing and implementing such processes presents significant challenges because of the highly flammable characteristic of magnesium and disposing of the organic byproducts, such as oil, grease, and hydrocarbons, in an environmentally responsible manner.

SUMMARY

The present disclosure teaches magnesium scrap cleaning processes that remove surface organics, such as oil, grease, hydrocarbons, and other contaminants from dirty, magnesium scrap produced from different machining operations and provide clean, organic-free magnesium scrap ready for re-melting. The magnesium scrap cleaning processes significantly reduce the dross produced from melting the magnesium scrap.

In the illustrative embodiment, a method of preparing dirty, unprocessed magnesium scrap for reuse comprises enclosing the magnesium scrap in a controlled environment. The controlled environment isolates the dirty, unprocessed magnesium scrap from surrounding environmental factors and prevents the removed surface contaminants from the dirty, unprocessed magnesium scrap from entering the surrounding environment.

In the illustrative embodiments, the method further comprises spraying the magnesium scrap with detergent solution in a containment chamber. The detergent solution is configured to break down and remove surface contaminants to produce partially processed magnesium scrap. In the illustrative embodiment, the detergent solution is heated to a preselected temperature above ambient temperature to encourage cleaning while managing material volatility.

In the illustrative embodiments, the method further comprises rinsing the magnesium scrap with water. The water clears away the detergent solution and surface contaminants from the partially processed magnesium scrap to produce wet, processed magnesium scrap that is substantially free of the surface contaminants. In the illustrative embodiment, the water is heated to a preselected temperature above ambient temperature to support detergent removal while managing material volatility.

In the illustrative embodiment, the method further comprises drying the magnesium scrap. The drying step includes applying heat to the wet, processed magnesium scrap to produce clean, dry magnesium scrap without waiting for air drying. The resulting clean magnesium scrap is suitable for reuse without creation of excessive dross during re-melting, thereby reducing the environmental impact of re-melting the clean magnesium scrap.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
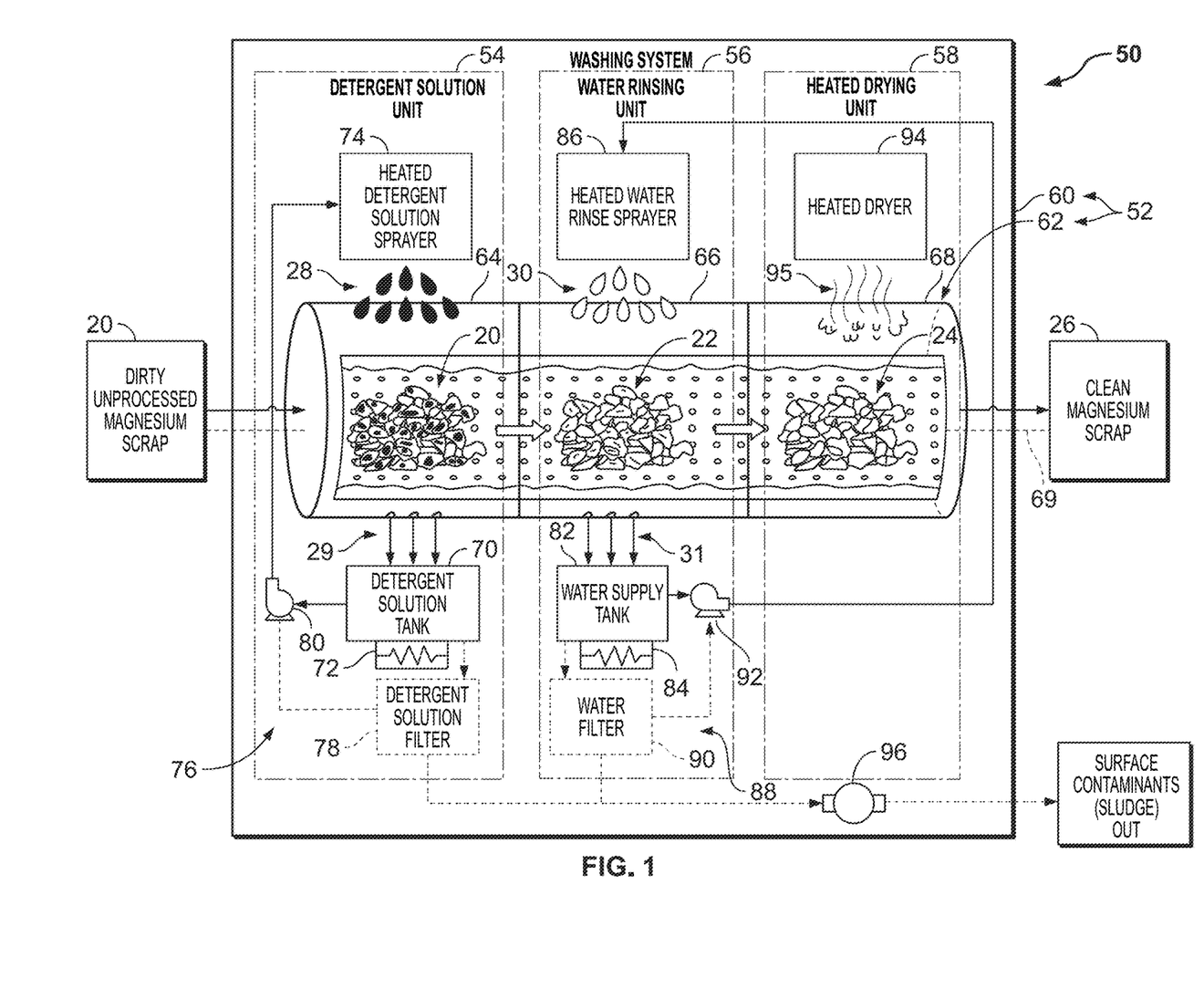
FIG. 1 is a diagrammatic view of a washing system for processing dirty, unprocessed magnesium scrap. The diagram shows the washing system which includes (i) a detergent solution unit for spraying the dirty, unprocessed magnesium scrap with a detergent solution to break up oil, grease, and hydrocarbons from the magnesium scrap, (i) a water rinsing unit for rinsing the partially processed magnesium scrap with water to remove the detergent solution, oil, grease, and hydrocarbons, and (i) a heated drying unit for applying heat to the wet processed magnesium scrap to dry the magnesium scrap before re-melting of the cleaned and dried magnesium scrap.

A washing system 50 adapted to perform a magnesium scrap cleaning process 10 for preparing dirty, unprocessed magnesium scrap 20 into clean magnesium scrap 26 for re-melting is shown in FIG. 1. Different magnesium manufacturing processes, such as casting, machining, cutting, etc. produce magnesium scrap that may be recycled or re-melted for reuse. However, post-consumer magnesium scrap 20 may be covered in organic waste, such as oil, grease, hydrocarbons, and/or other impurities/contaminants, that are harmful or hazardous to people and the environment if melted with the magnesium scrap 20 during re-melting of magnesium scrap 20. As such, these organics, or surface contaminants, can make recycling magnesium scrap 20 difficult, inefficient, and expensive.

Figure 2:
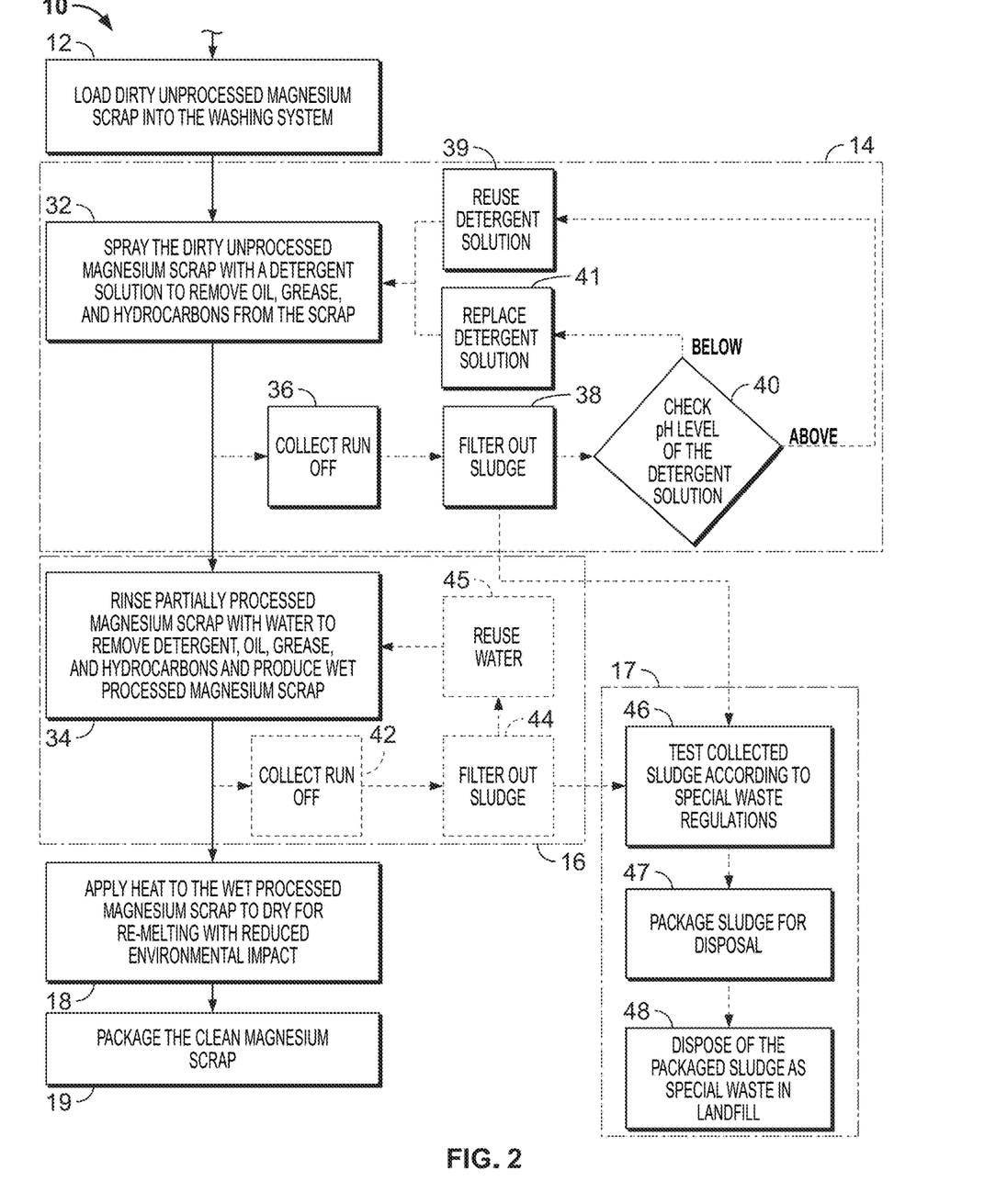
FIG. 2 is a diagrammatic view of a magnesium scrap washing process using the washing system of FIG. 1 showing that the magnesium scrap washing process includes (i) loading dirty, unprocessed magnesium scrap into a drum of the washing system, (ii) spraying dirty, unprocessed magnesium scrap with the detergent solution, (iii) rinsing the partially processed magnesium scrap with water, (iv) applying heat to the wet processed magnesium scrap to dry the magnesium scrap, and (v) filtering out organic and metallic surface contaminants removed from the magnesium scrap from the detergent solution and the water so as to reuse the detergent solution and water in a closed loop in the washing system.

The magnesium cleaning process 10, illustrated in FIG. 2, includes several stages that enable recycling of dirty, unprocessed magnesium scrap 20 safely, at low-cost, and with high efficiency to produce clean magnesium scrap 26. This clean magnesium scrap 26 is suitable for re-melt without creation of excessive dross during re-melting thereby reducing environmental impact of re-melting clean magnesium scrap 26. In particular, the magnesium cleaning process 10 includes the removal of surface contaminants using the washing system 50 to provide clean, organic-free magnesium scrap 26 suitable for reuse.

Magnesium is typically extremely flammable, especially when exposed to sparks, fire, static electricity, or temperatures above 500 degrees Fahrenheit. In some cases, a magnesium fire may result in an explosion if the magnesium fire is put into contact with water. This makes removing the contaminants such as oil, grease, and other machine lubricants on the magnesium scrap 20 a specialized challenge. As such, the magnesium scrap cleaning process 10 includes several stages, operating procedures, and special industrial equipment to minimize and mitigate the risk of fire while also removing the unwanted contaminates when cleaning the magnesium scrap 20.

The magnesium scrap cleaning process 10 includes a loading stage 12, a detergent stage 14, a rinsing stage 16, and a drying stage 18 as shown in FIG. 2. The loading stage 12 includes enclosing dirty, magnesium scrap 20 in a controlled environment that is isolated from surrounding environmental factors. The detergent stage 14 includes spraying a detergent solution 28 on the dirty, unprocessed magnesium scrap 20 to break down and remove surface contaminants as indicated by block 32. The rinsing stage 16 includes rinsing partially processed magnesium scrap 22 with water 30 to clear away the detergent solution 28 and surface contaminants from the partially processed magnesium scrap 22 as indicated by block 34. The drying stage 18 includes drying the wet, processed magnesium scrap 24 so as to produce clean magnesium scrap 26 that is suitable for re-melt without creation of excessive dross during re-melting.

In both the detergent and rinsing stages 14, 16, the excess detergent solution 29 and water runoff 31 are collected during the respective stages 14, 16. As the detergent solution 28 breaks down and removes the surface contaminants from the magnesium scrap 20, the excess detergent solution 29 collected gathers the organics removed. Similarly, as the water 30 rinses the magnesium scrap 22, the excess water 31 collects additional organics removed. The accumulated surface contaminants are then separated out of the excess detergent solution 29 and excess water 31 so that the detergent solution 28 and water 30 can be reused in the washing system 50, and the separated surface contaminants disposed of safely.

The reduction of excessive dross reduces the environmental impact of re-melting the clean magnesium scrap 26, as the dross produced from re-melting the dirty, unprocessed magnesium scrap 20 can be harmful to people and the environment. However, applying water to the magnesium scrap 20 to remove any of the surface contaminants can be hazardous since magnesium fires are exacerbated if contacted by water. Therefore, the magnesium cleaning process 10 includes the loading stage 12 to control the environment of the magnesium scrap 20 during the detergent stage 14, rinsing stage 16, and drying stage 18, all of which are temperature controlled. In this way, the magnesium scrap 20 is protected from surrounding environmental factors at the different hazardous stages. Enclosing the magnesium scrap 20 also ensures the surface contaminants removed from the magnesium scrap 20 are captured within the system 50 so that all the surface contaminants can be safely captured, filtered out, and disposed of.

The dirty, unprocessed magnesium scrap 20 is loaded into the washing system 50 to enclose the magnesium scrap 20 as suggested in FIGS. 1 and 2. The washing system 50 provides the controlled environment for the magnesium cleaning process 10 and captures the surface contaminants removed during the magnesium cleaning process 10. In the illustrative embodiment, the washing system 50 also continuously moves the dirty, magnesium scrap, through the detergent stage 14, the rinsing stage 16, and the drying stage 18. In some embodiments, continuously moving the magnesium scrap 20 can remove dust and fines that are more susceptible to catching fire if heated and exposed to water.

In the illustrative embodiment, the detergent stage 14 further includes collecting excess detergent solution 29 produced from the spraying step 32 as indicated by block 36 as shown in FIG. 2. During the spraying step 32, the excess detergent solution 29 is collected in a detergent solution tank 70 as shown in FIG. 1. The detergent solution tank 70 stores the excess detergent solution 29 for the washing system 50. In the illustrative embodiment, the detergent solution 28 in the detergent solution tank 70 is heated to a temperature above ambient temperature.

In some embodiments, the detergent stage 14 includes heating the detergent solution 28 to a temperature of at least 120 degrees Fahrenheit. In other embodiments, the temperature of the detergent solution 28 is greater than or equal to 130 degrees Fahrenheit. In certain embodiments, the temperature of the detergent solution 28 is between about (or precisely) 120 degrees Fahrenheit and about (or precisely) 140 degrees Fahrenheit. In the illustrative embodiment, the temperature of the detergent solution 28 is about 140 degrees Fahrenheit.

In the illustrative embodiment, the detergent stage 14 further includes separating any surface contaminants from the excess detergent solution 29 collected as indicted by block 38 and reusing the detergent solution 28 in the spraying step 32 as indicated by block 39 in FIG. 2. After the dirty, magnesium scrap 20 is sprayed with the detergent solution 28, the surface contaminants removed by the detergent solution 28 accumulate in the excess detergent solution 29. These surface contaminants are then be collected in the detergent solution tank 70 along with the excess detergent solution 29.

The collecting step 38 and the reusing step 39 ensure the surface contaminants are contained in the system 50. However, the surface contaminants collected (also referred to as sludge) may build up in the detergent solution tank 70 over time. To separate the sludge from the excess detergent solution 29, the detergent stage 14 includes constantly filtering the surface contaminants using a detergent solution filter 78.

In other embodiments, the sludge may be separated by letting the excess detergent solution 29 collected in the detergent solution tank 70 sit so that the sludge settles at a bottom of the detergent solution tank 70. In some embodiments, the detergent solution 29 may be pumped out of the system 50 into another separate tank and left to sit so that the sludge settles. After the sludge settles, the method continues by pumping out the excess detergent solution 29 for reuse in the washing system 50. The sludge is then safely disposed in a disposal stage 17, while the filtered detergent solution 29 is reused in the washing system 50.

In the illustrative embodiment, the detergent stage 14 further includes measuring or checking a pH level of the detergent solution 28 in the detergent solution tank 70 as indicated by block 40. As the detergent solution 28 is reused in the washing system, the pH level in the detergent solution 28 may decrease over time. As the pH level decreases, the detergent solution 28 may become less effective at removing the surface contaminants from the dirty, unprocessed magnesium scrap 20.

As such, the process 10 includes determining if the pH level of the detergent solution 28 is above or below a predetermined pH level as shown in FIG. 2. If the pH level of the detergent solution 29 is above the predetermined pH level, the process 10 includes reusing the excess detergent solution 29 as indicated by block 39. If the pH level is below the predetermined pH level, the process 10 includes replacing the excess detergent solution 29 as indicated by block 41.

In the illustrative embodiment, the predetermined pH level is 9. In some embodiments, the predetermined pH level may be about (or precisely) 10. In some embodiments, the predetermined pH level may be about (or precisely) 11. In some embodiments, the predetermined pH level may be about (or precisely) 11.7.

In other embodiments, the method includes determining if the pH level of the detergent solution 28 is within a predetermined pH level threshold. If the pH level of the detergent solution 29 is within the predetermined pH level threshold, the process 10 includes reusing the excess detergent solution 29. If the pH level is less than the predetermined pH level threshold, the process 10 includes replacing the excess detergent solution 29. In such embodiments, the predetermined pH level threshold may be between 9 and 11.7.

In other embodiments, the detergent stage 14 may include measuring a detergent concentration level or the alkalinity of the detergent solution 28 in the detergent solution tank 70. Similar to the pH level, the detergent concentration level in the detergent solution 28 may decrease over time as the detergent solution 28 is reused in the system 50 and may become less effective at removing the surface contaminants from the dirty, unprocessed magnesium scrap 20.

As such, the process may include determining if the detergent concentration level of the detergent solution 28 is above a predetermined concentration level. If the detergent concentration level is above the predetermined concentration level, the process includes reusing the detergent solution 28. If the detergent concentration level is below the predetermined concentration level, the process includes replacing the detergent solution 28.

In some embodiments, the predetermined concentration level may be about six percent. In other embodiments, the predetermined concentration level may be about between about six percent and 10 percent.

In the illustrative embodiment, the rinsing stage 16 may further include collecting water runoff 31 as indicated by block 42 in FIG. 2. During the rinsing step 34, the water runoff 31 from the partially processed magnesium scrap 22 is collected in a water tank 82 as shown in FIG. 1. The water tank 82 stores the excess water 30 for the washing system 50. In the illustrative embodiment, the water 30 in the water tank 82 is heated to a temperature above ambient temperature.

In some embodiments, the rinsing stage 16 includes heating the water 30 in the water tank 82 to a temperature of at least 120 degrees Fahrenheit. In other embodiments, the temperature of the water 30 is greater than or equal to 130 degrees Fahrenheit. In other embodiments, the temperature of the water 30 is between about (or precisely) 120 degrees Fahrenheit and about (or precisely) 140 degrees Fahrenheit. In the illustrative embodiment, the temperature of the water 30 is about 140 degrees Fahrenheit.

In the illustrative embodiment, the rinsing stage 16 may further include separating any surface contaminants from the water runoff 31 collected as indicated by block 44 and reusing the water 30 in the rinsing step 34 as indicated by block 45 in FIG. 2. As the partially processed magnesium scrap 22 is rinsed with water 30, the water runoff 31 includes the surface contaminants and creates the sludge. The sludge is thus collected in the water tank 82 and then removed.

In the illustrative embodiment, the separation step 44 includes filtering the water runoff 31 to separate out the sludge. In other embodiments, the surface contaminants may be separated by letting the water runoff 31 collected in the water tank 82 sit so that the sludge settles at the bottom of the water tank 82. After the sludge settles, the method continues by pumping out the water 31 for reuse in the washing system 50.

Once the sludge is separated from the excess detergent solution 29 and/or the excess water runoff 31, the sludge or surface contaminants move on to the disposal stage 17 as shown in FIG. 2. The disposal stage 17 may include testing the sludge as indicated by block 46, packaging the sludge as indicated by block 47, and disposing of the packaged sludge as special waste in a landfill.

In the illustrative embodiment, the sludge is tested for conformance to environmental standards. Unlike the dross created by re-melting dirty, magnesium scrap 20, the surface contaminants may be disposed of as a special waste. Special wastes may be safely disposed of in a landfill, if the sludge meets the environmental standards set in place.

In the illustrative embodiment, the drying stage 18 further includes applying heat to dry the wet, processed magnesium scrap 24. In the illustrative embodiment, the heat is applied by directing a flow of air 95 at the wet, processed magnesium scrap 24 as shown in FIG. 1. The flow of air 95 is heated to a temperature above ambient temperature in the illustrative embodiment.

In the illustrative embodiment, the flow of air 95 is heated to about 240 degrees Fahrenheit. In other embodiments, the maximum temperature of the flow of air may be a maximum of 300 degrees Fahrenheit. In other embodiments, the wet, processed magnesium scrap 24 may be let to sit and air-dried.

In some embodiments, the magnesium cleaning process 10 may further include removing dust and fines from the dirty, magnesium scrap 20. Removing the dust and fines from the dirty, unprocessed magnesium scrap 20 can help in mitigating the risk of a fire since magnesium dust and fines are more susceptible to combustion. This risk can increase with the introduction of water. Therefore, the washing system 50 continuously moves the magnesium scrap 20 throughout the cleaning process 10 to remove the dust and fines and decrease the risk of fire.

In the illustrative embodiment, the dust and fines are removed by tumbling the dirty, unprocessed magnesium scrap 20 in a grated drum 62 as shown in FIG. 1. The grated drum 62 rotates the dirty, magnesium scrap 20 about an axis 69 so as to remove dust and fines from the dirty, magnesium scrap 20 as the detergent solution 28, the water 30, and the heat 95 is applied.

The clean magnesium scrap 26 may then be packaged outside of the system 50 as indicated by block 19 in FIG. 2. The packaged clean magnesium scrap 26 may then be shipped to the customer or re-melted for reuse.

In the illustrative embodiment, reuse of clean magnesium scrap 26 includes re-melting the magnesium scrap 26 to recast the magnesium into magnesium ingots. The clean magnesium scrap 26 is suitable for re-melt without creation of excessive dross during the recasting process thereby reducing environmental impact of recasting the clean magnesium scrap 26. In other embodiments, reuse of clean magnesium scrap 26 may include other manufacturing processes or using the processed magnesium scrap 44 as an alloying material.

Figure 3:
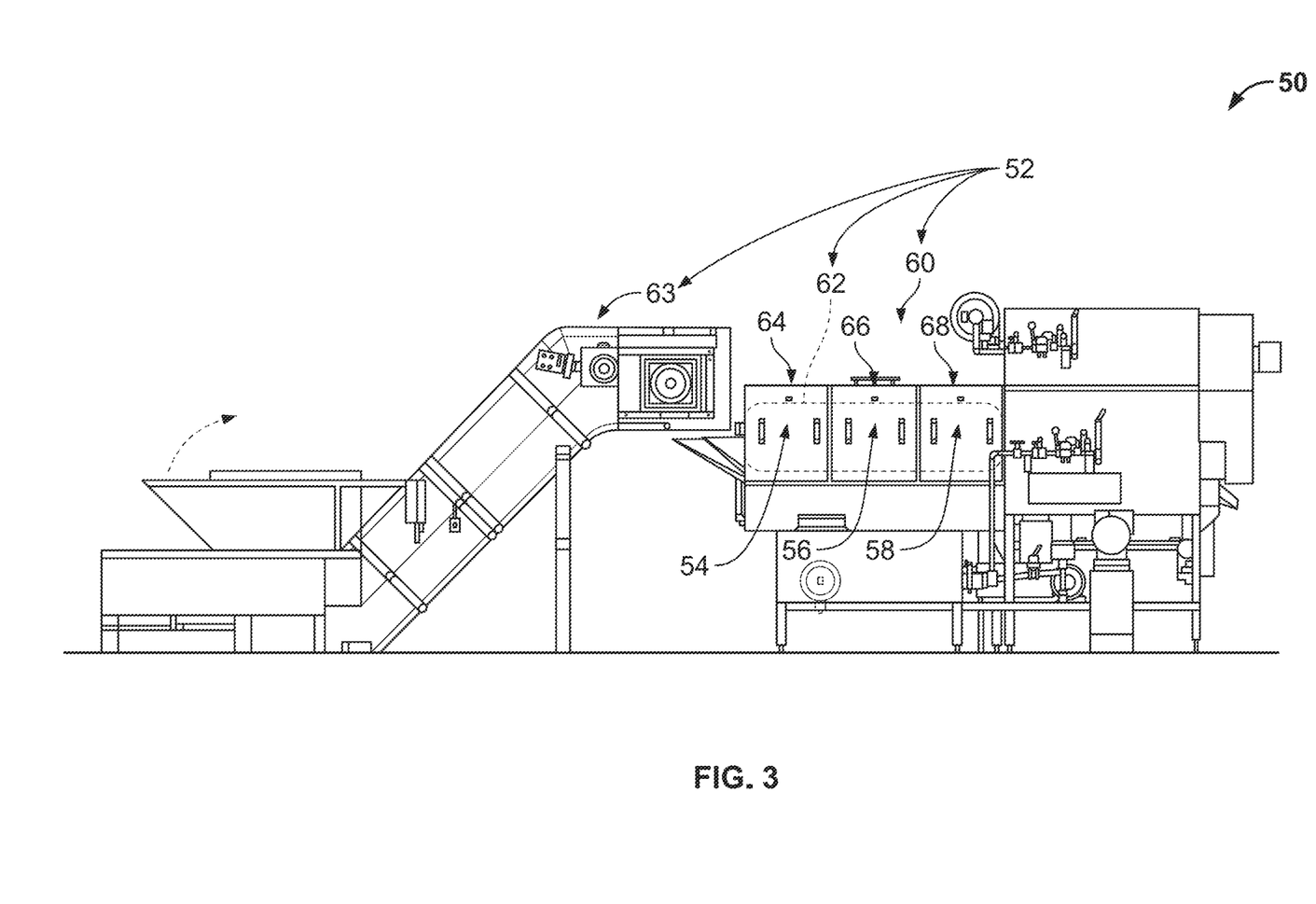
FIG. 3 is an elevation view of the washing system of FIG. 1 showing the washing system further includes a housing unit that encloses the magnesium scrap cleaning process in a controlled environment and a loading conveyor to load the dirty, unprocessed magnesium scrap into the housing unit of the washing system.
Figure 4:
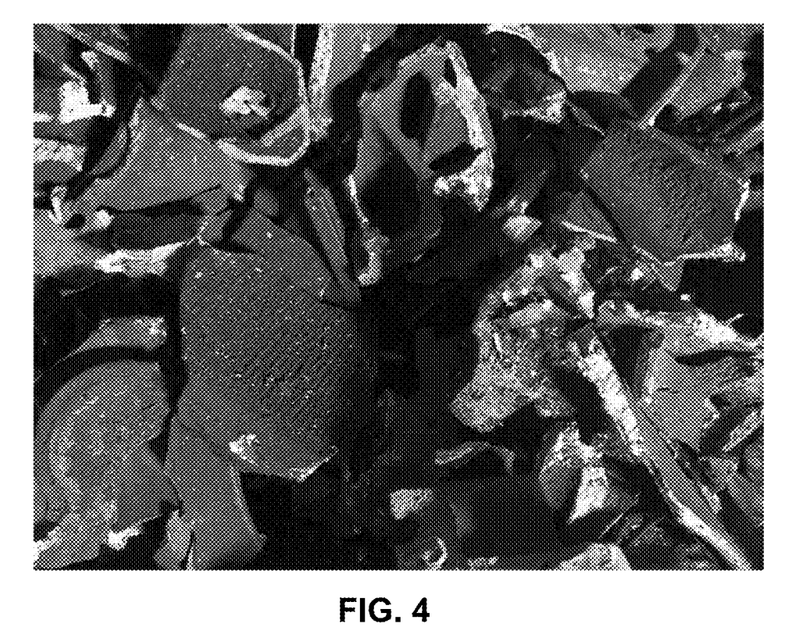
FIG. 4 is perspective view of the dirty, unprocessed magnesium scrap before the magnesium scrap washing process.
Figure 5:
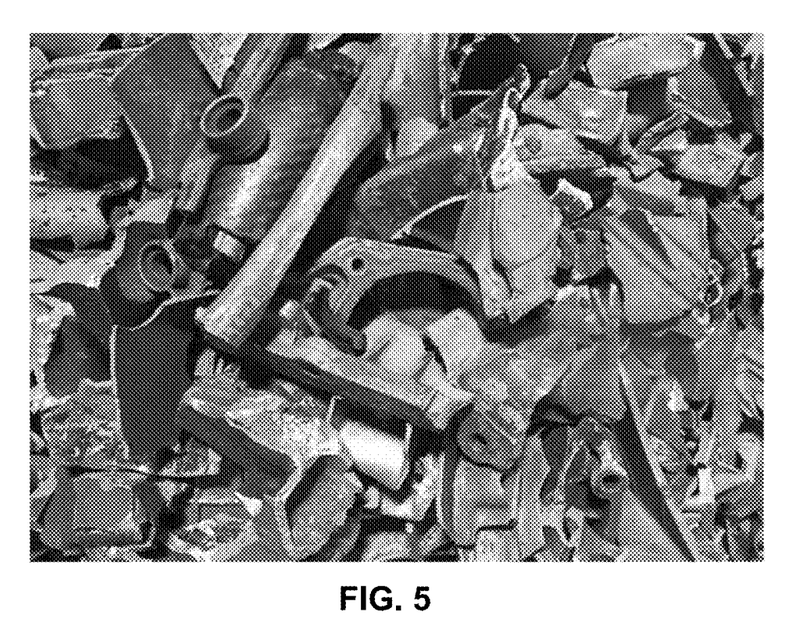
FIG. 5 is perspective view of the clean magnesium scrap after the magnesium scrap washing process.

Turning again to the washing system 50 adapted to perform the magnesium scrap cleaning processes 10, the washing system 50 includes a main body or enclosure 52, a detergent solution unit 54, a water rinsing unit 56, and a heated drying unit 58 as shown in FIGS. 1 and 3. The main body 52 receives the dirty, unprocessed magnesium scrap 20 loaded into the washing system 50 and contains the magnesium cleaning process 10 so that the magnesium cleaning process 10 is not exposed to surrounding environmental factors. The detergent solution unit 54 is configured to carry out the detergent stage 14 of the process 10, i.e. apply the detergent solution 28 to the dirty, unprocessed magnesium scrap 20. The water rinse unit 56 is configured to carry out the rinsing stage 16, i.e. rinse the partially processed magnesium scrap 22 to remove the detergent solution 28 and surface contaminants. The heated dying unit 58 is configured to carry out the drying stage 18, i.e. dry the wet, processed magnesium scrap 24 to produce the clean magnesium scrap 26 for reuse.

The main body 52 of the washing system 50 includes a housing unit 60 and an in-feed and out-feed conveyor 62 as shown in FIGS. 1 and 3. The housing unit 60 or containment chamber, is divided into a detergent solution section 64 housing the detergent solution unit 54, a water rinse section 66 housing the water rinse unit 56, and a drying section 68 housing the heated drying unit 58. These sections 64, 66, 68 can be overlapping, spaced apart, and/or immediately adjacent one another. In some embodiments, the sections 64, 66, 68 are separated by curtains of material or air as desired.

The housing unit 60 contains the magnesium cleaning process 10 to ensure the magnesium cleaning process 10 is not exposed to the surrounding environment. The conveyor 62 is enclosed in the housing unit 60 and extends between the different sections 64, 66, 68. The conveyor 62 is configured to transport the dirty, unprocessed magnesium scrap 20 through the detergent solution section 64, the water rinse section 66, and the drying section 68 of the housing unit 60.

In the illustrative embodiment, the conveyor 62 is the grated drum 62 as shown in FIG. 1. The grated drum 62 is configured to rotate about the axis 69 to tumble the dirty, magnesium scrap 20. By tumbling the dirty, unprocessed magnesium scrap 20, the grated drum 62 removes dust and fines from the dirty, magnesium scrap 20.

In the illustrative embodiment, the dust and fine magnesium scrap may be pieces of magnesium scrap less than one and half inches in length. In other embodiments, the pieces may be less than one inch in length. The grates on the drum 62 are sized accordingly to remove the dust and fines.

In the illustrative embodiment, the washing unit 50 may further include a loading conveyor 63 as shown in FIG. 3. The loading conveyor 63 is coupled to the housing unit 60 and configured to load the grated drum 62 with the dirty, unprocessed magnesium scrap 20. In some embodiments, the loading conveyor 63 may also be configured to remove dust and fines from the dirty, unprocessed magnesium scrap 20 as it is loaded into the grated drum 62.

In some embodiments, the loading conveyor 63 may have a magnet and a trommel screen. The magnet may be configured to extract the iron particulates using a magnet to remove the iron particulates from the dirty, unprocessed magnesium scrap 20. The trommel screen may be configured to shift the dirty, unprocessed magnesium scrap 20 to remove the particulate pieces from the dirty, unprocessed magnesium scrap 20. In other embodiments, the loading conveyor 63 may be hand sorted to remove any unwanted or hazardous pieces of magnesium.

The detergent solution unit 54 includes the detergent solution tank 70, a detergent solution heater 72, and a heated detergent solution sprayer 74 as shown in FIG. 1. The detergent tank 70 is located radially inward of the conveyor 62 to collect excess detergent solution 29 from the detergent solution section 64 of the housing unit 60. The detergent solution tank 70 is configured to store the detergent solution 28 for the washing system 50. The detergent solution heater 72 is coupled to the detergent solution tank 70 and configured to heat the detergent solution 28 stored in the detergent solution tank 70. The heated detergent sprayer 74 is coupled to the detergent solution tank 70 and configured to spray the detergent solution 28 on the dirty, unprocessed magnesium scrap 20 in the detergent solution section 64.

In the illustrative embodiment, the detergent solution heater 72 is configured to heat the detergent solution 28 to a temperature above ambient temperature. In some embodiments, the temperature of the detergent solution 28 is at least 120 degrees Fahrenheit. In other embodiments, the temperature of the detergent solution 28 is greater than or equal to 130 degrees Fahrenheit. In other embodiments, the temperature of the detergent solution 28 is between about 120 degrees Fahrenheit and about 140 degrees Fahrenheit. In the illustrative embodiment, the temperature of the detergent solution 28 is about 140 degrees Fahrenheit. Higher temperatures are contemplated in this disclosure.

In the illustrative embodiment, the detergent solution unit 54 further includes a detergent solution filter system 76 as shown in FIG. 1. The detergent solution filter system 76 is configured to separate the detergent solution 28 from surface contaminates or sludge collected in the detergent solution tank 70.

In the illustrative embodiment, the detergent solution filter system 76 further includes a detergent solution filter 78 and a detergent solution pump 80 as shown in FIG. 1. The detergent solution filter 78 is coupled to the detergent solution tank 70 and receives the excess detergent solution 29 collected to separate surface contaminants from the excess detergent solution 29. The detergent solution pump 80 is coupled between the detergent solution filter 78 and the detergent solution sprayer 74. The detergent solution pump 80 is configured to pump the filtered detergent solution to the detergent solution sprayer 74 for reuse in spraying the dirty, unprocessed magnesium scrap 20.

In other embodiments, the detergent solution unit 54 may just include the pump 80. In such embodiments, the pump 80 may coupled between the detergent solution tank 70 and the detergent solution sprayer 74. The pump 80 may be configured to pump stored excess detergent solution 29 to the sprayer 74 for reuse.

In the illustrative embodiment, the detergent solution filter 78 is further configured to measure the pH level of the detergent solution 28 from the detergent solution tank 70. To ensure the pH level of the detergent solution 28 is high enough to effectively remove the surface contaminants, the filter 78 is configured to compare the measured pH level to the predetermined pH level and determine if the detergent solution 28 is reusable.

If the pH level is equal to the predetermined pH level, the pump 80 reuses the filtered detergent solution 28 in the spraying step 32. Similarly, if the pH level is above the predetermined pH level, the pump 80 reuses the filtered detergent solution 28 in the spraying step 32. However, if the pH level is below the predetermined pH level, more detergent is automatically dosed to the detergent solution 28 in the washing system 50.

In the illustrative embodiments, the washing system 50 automatically adds or doses detergent to the detergent solution 28 in the detergent tank 70 or at the detergent solution sprayer 74. In other embodiments, the filter 78 may indicates the detergent solution 28 should be manually replenished or changed.

In other embodiments, the filter 78 is configured to measure the detergent concentration level of the detergent solution 29 from the detergent solution tank 70, compare the measured detergent concentration level to a predetermined concentration level, and determine if the detergent solution 29 is reusable. If the detergent concentration level is greater than or equal to the predetermined concentration level, the pump 80 reuses the filtered detergent solution 28 for spraying the dirty, magnesium scrap 20. However, if the detergent concentration level is below the predetermined concentration level, more detergent is automatically dosed to the detergent solution 28 in the washing system 50.

In other embodiments, the detergent solution sprayer 74 may be coupled to a separate detergent solution supply that supplies the sprayer 74 with detergent solution 28. The separate detergent solution supply may be coupled to the heater 72 to heat the detergent solution 28. The detergent solution tank 70 is configured to collect excess detergent solution 29, where the filter 78 is coupled to the tank 70 to filter the excess detergent solution 29 before the filtered detergent solution 28 is disposed. The filter 78 filters out the sludge so that the detergent solution 29 can be safely disposed out of the system 50.

The water rinsing unit 56 includes the water tank 82, a water heater 84, and a heated water rinse sprayer 86 as shown in FIG. 1. The water tank 82 is located radially inward of the conveyor 62 to collect excess water runoff 31 from the water rinse section 66 of the housing unit 60. The water tank 82 is configured to store water 30 for the washing system 50. The water heater 84 is coupled to the water tank 82 and is configured to heat the water 30 stored in the water tank 82. The heated water rinse sprayer 86 is coupled to the water tank 82 and is configured to spray a flow of water 30 on the partially processed magnesium scrap 22 in the water rinse section 66 to clear away the detergent solution 28, oil, grease, hydrocarbons, and other contaminants from the partially processed magnesium scrap 22.

In the illustrative embodiment, the water heater 84 is configured to heat the water 30 to a temperature above ambient temperature. In some embodiments, the temperature of the water 30 is at least 120 degrees Fahrenheit. In other embodiments, the temperature of the water 30 is greater than or equal to 130 degrees Fahrenheit. In other embodiments, the temperature of the water 30 is between about 120 degrees Fahrenheit and about 140 degrees Fahrenheit. In the illustrative embodiment, the temperature of the water 30 is about 140 degrees Fahrenheit. Higher temperatures are contemplated in this disclosure.

In the illustrative embodiment, the water rinsing unit 56 further includes a water filter system 88 as shown in FIG. 1. The water filter system 88 is configured to separate surface contaminates that are collected in the water tank 82.

The water filter system 88 includes a water filter 90 and a water pump 92 as shown in FIG. 1. The water filter 90 is coupled to the water tank 82 and is configured to separate surface oil, grease, hydrocarbons, and other contaminates from the excess water runoff 31 collected in the water tank 82. The water pump 92 is coupled between the water filter 90 and the water rinse sprayer 86. The water pump 92 is configured to pump the filtered water 30 to the water rinse sprayer 86 for reuse in rinsing the partially processed magnesium scrap 22.

In other embodiments, the water rinse unit 56 may just include the pump 92. In such embodiments, the pump 92 may be coupled between the water tank 82 and the water rinse sprayer 86. The pump 92 may be configured to pump stored excess water 31 to the sprayer 86 for reuse.

In other embodiments, the heated water rinse sprayer 86 is coupled to a separate water supply and the excess water runoff 31 is collected in the water tank 82. The water 31 collected in the tank 82 is then filtered through the water filter 90 before being disposed of out of the washing system 50. After filtration, the water 31 is safe to dispose in a normal storm drain.

In the illustrative embodiment, the washing system 50 may further include a sludge pump 96 coupled to the detergent solution filter 78 and the water filter 90 as shown in FIG. 1. The sludge pump 96 is configured to pump the separated sludge out of the system 50 so that it may be disposed of according to the disposal stage 17 of the process 10.

The heated drying unit 58 includes a heated dryer 94 as shown in FIG. 1. The heated dryer 94 is configured to apply heat to the wet, processed magnesium scrap 24 to dry the wet, processed magnesium scrap 24. In the illustrative embodiment, the heater dryer 94 provides a flow of heater air 95 as shown in FIG. 1. The temperature of the flow of air 95 is about 240 degrees Fahrenheit. In other embodiments, the temperature of the flow of air 95 is less than 500 degrees Fahrenheit, thought higher temperatures are contemplated.

For the purposes of the present disclosure, the modifier "about" means±5% of a given valve. Of course, greater or lesser deviation is contemplated and may be used in processed methods within the spirit of this disclosure.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A method of preparing low-grade magnesium scrap for reuse, the method comprising enclosing the low-grade magnesium scrap in a controlled environment provided, at least in part, by a dedicated housing unit having a detergent solution section, a water rinse section, and a drying section that are interconnected with each other and located in the dedicated housing unit so that the dedicated housing unit isolates the low-grade magnesium scrap from a surrounding environment and prevents any surface contaminants on the low-grade magnesium scrap from entering the surrounding environment, spraying a detergent solution on to the low-grade magnesium scrap to break down and remove surface contaminants to produce partially processed magnesium scrap in the detergent solution section of the dedicated housing unit, rinsing the partially processed magnesium scrap with water to clear away the detergent solution and surface contaminants from the partially processed magnesium scrap to produce wet, processed magnesium scrap that is substantially free of surface contaminants in the water rinse section of the dedicated housing unit, drying the wet, processed magnesium scrap to produce clean magnesium scrap that is suitable for re-melt without creation of excessive dross during re-melting thereby reducing environmental impact of re-melting the clean magnesium scrap in the drying section of the dedicated housing unit, collecting excess detergent solution during the spraying step in a detergent solution tank located within the controlled environment isolated from the surrounding environment and collecting water runoff during the rinsing step in a water tank located within the controlled environment isolated from the surrounding environment, separating any surface contaminants including oil, grease, hydrocarbons, other machining lubricants, and metallic materials from the excess detergent solution and the water runoff collected within the controlled environment by filtering out the oil, grease, hydrocarbons, other machining lubricants, and metallic materials from the excess detergent solution and the water runoff within the controlled environment, testing the oil, grease, hydrocarbons, other machining lubricants, and metallic materials separated from the detergent solution and water runoff for conformance to environmental standards associated with special waste designations suitable for disposal in a landfill, and disposing the oil, grease, hydrocarbons, other machining lubricants, and metallic materials in the landfill as special waste upon confirmation of conformance with the environmental standards.

2. The method of claim 1, wherein the drying step includes applying heat to the wet, processed magnesium scrap to dry the wet, processed magnesium scrap.

3. The method of claim 2, wherein the applying heat step includes directing a flow of air at the wet, processed magnesium scrap that is heated to a temperature above ambient temperature.

4. The method of claim 3, wherein temperature of the flow of air is about 240 degrees Fahrenheit.

5. The method of claim 1, wherein the detergent solution is heated to a temperature above ambient temperature.

6. The method of claim 5, wherein the temperature of the detergent solution is between about 120 degrees Fahrenheit and about 140 degrees Fahrenheit.

7. The method of claim 1, wherein the water is heated to a temperature above ambient temperature.

8. The method of claim 7, wherein the temperature of the water is between about 120 degrees Fahrenheit and about 140 degrees Fahrenheit.

9. The method of claim 1, wherein the method further comprises reusing the detergent solution in the spraying step.

10. The method of claim 9, wherein the method further comprises reusing the water in the rinsing step.

11. The method of claim 9, wherein the method further comprises measuring a pH level of the detergent solution in the detergent solution tank, determining if the pH level of the detergent solution is above a predetermined pH level, and reusing the detergent solution if the pH level is above the predetermined pH level.

12. The method of claim 11, wherein the method further comprises replacing the detergent solution if the pH level of the detergent solution is below the predetermined pH level.

13. The method of claim 1, wherein the method further comprises tumbling the low-grade magnesium scrap in a grated drum that rotates the low-grade scrap about an axis so as to remove dust and fines from the low-grade scrap as the detergent solution, the water, and the heat is applied.

14. A method of preparing magnesium scrap for reuse, the method comprising enclosing the magnesium scrap in a controlled environment provided by a dedicated housing unit having a detergent solution section, a water rinse section, and a drying section that are interconnected with each other and located in the dedicated housing unit so that the dedicated housing unit isolates the magnesium scrap from a surrounding environment and prevents any surface contaminants on the magnesium scrap from entering the surrounding environment, spraying a detergent solution on to the magnesium scrap to break down and remove surface contaminants to produce partially processed magnesium scrap in the detergent solution section of the dedicated housing unit, rinsing the partially processed magnesium scrap with water to clear away the detergent solution and surface contaminants from the partially processed magnesium scrap to produce wet, processed magnesium scrap that is substantially free of surface contaminants in the water rinse section of the dedicated housing unit, drying the wet, processed magnesium scrap to produce clean magnesium scrap that is suitable for re-melt without creation of excessive dross during re-melting thereby reducing environmental impact of re-melting the clean magnesium scrap in the drying section of the dedicated housing unit, collecting excess detergent solution during the spraying step in a detergent solution tank located within the controlled environment isolated from the surrounding environment, separating any surface contaminants from the excess detergent solution collected within the controlled environment isolated from the surrounding environment, and reusing the detergent solution in the spraying step, wherein the spraying step, the rinsing step, the drying step, and the collecting step, the separating step, and the reusing step of the detergent solution occur simultaneously to contain the surface contaminants removed from the magnesium scrap within the controlled environment.

15. The method of claim 14, wherein the method further comprises collecting water runoff from the partially processed magnesium scrap during the rinsing step in a water tank separate from the detergent solution tank and located within the controlled environment isolated from the surrounding environment, separating any surface contaminants from the water runoff collected within the controlled environment, and reusing the water in the rinsing step.

16. The method of claim 15, wherein the reusing step of the detergent solution includes pumping filtered detergent solution from the detergent solution tank directly to a detergent solution sprayer fluidly coupled to the detergent solution tank and configured to spray the detergent solution and wherein the reusing step of the water includes pumping filtered water from the water tank directly to a water sprayer fluidly coupled to the water tank and configured to spray the water.

17. The method of claim 14, wherein the method further comprises measuring a pH level of the detergent solution in the detergent solution tank, determining if the pH level of the detergent solution is above a predetermined pH level, and reusing the detergent solution if the pH level is above the predetermined pH level.

18. A method of preparing magnesium scrap for reuse, the method comprising
- enclosing the magnesium scrap in a controlled environment provided by a dedicated housing unit having a detergent solution section, a water rinse section, and a drying section that are interconnected with each other and located in the dedicated housing unit so that the dedicated housing unit isolates the magnesium scrap from a surrounding environment and prevents any surface contaminants on the magnesium scrap from entering the surrounding environment,
- spraying a detergent solution on to the magnesium scrap to break down and remove surface contaminants to produce partially processed magnesium scrap in the detergent solution section of the dedicated housing unit,
- rinsing the partially processed magnesium scrap with water to clear away the detergent solution and surface contaminants from the partially processed magnesium scrap to produce wet, processed magnesium scrap that is substantially free of surface contaminants in the water rinse section of the dedicated housing unit,
- drying the wet, processed magnesium scrap to produce clean magnesium scrap that is suitable for re-melt without creation of excessive dross during re-melting thereby reducing environmental impact of re-melting the clean magnesium scrap in the drying section of the dedicated housing unit,
- wherein the spraying step, the rinsing step, and the drying step occur without exposing the magnesium scrap to an acidic solution.

19. The method of claim 18, wherein the method further comprises measuring a pH level of the detergent solution in a detergent solution tank located within the controlled environment, determining if the pH level of the detergent solution is above a predetermined pH level, and reusing the detergent solution if the pH level is above the predetermined pH level.

20. The method of claim 19, wherein the predetermined pH level of the detergent solution is basic with a value of about 9.

21. The method of claim 1, wherein the dedicated housing unit further includes a conveyor that extends between the detergent solution section, the water rinse section, and the drying section and is configured to transport the low-grade magnesium scrap through the detergent solution section, the water rinse section, and the drying section of the dedicated housing unit.

22. The method of claim 1, wherein the conveyor is provided by a grated drum configured to rotate about a horizontal axis.

* * * * *